United States Patent Office 3,102,074
Patented Aug. 27, 1963

3,102,074
ANTHELMINTIC COMPOSITIONS AND METHOD
OF EMPLOYING SAME
Horace D. Brown, Plainfield, N.J., assignor to Merck &
Co., Inc., Rahway, N.J., a corporation of New Jersey
No Drawing. Filed Mar. 1, 1961, Ser. No. 92,451
11 Claims. (Cl. 167—53)

This invention relates to novel compositions useful in the control of helminthic infections. More particularly, it is concerned with compositions containing as an active anthelmintic ingredient a 2-substituted benzoxazole or 2-substituted benzothiazole. It is concerned further with methods of using such compounds and compositions in the prevention and treatment of helminthiasis.

The infection known as helminthiasis involves infestation of the body and particularly the gastro-intestinal tract of animals with certain species of parasitic worms known as helminths. Helminthiasis has been reported to be one of the most common and widespread of all diseases. It is prevalent in man and is a serious economic problem in the raising of domestic animals such as sheep, cattle, goats, swine, dogs and poultry. Among the helminthic parasites, the nematodes of the genera Haemonchus, Trichostrongylus, Ostertagia, Nematodirus, Cooperia, Bunostomum, Oesophagostomum, Chabertia, Trichuris, Ascaris, Cappilaria, Heterakis and Ancyclostoma are the most common parasites of domestic animals. The diseases attributable to such parasitic infections, such as ascariasis, trichostrongylosis and gross parasitism are widespread and serious. The diseased host almost inevitably suffers from such conditions as malnutrition, anemia and general weakness. In addition to the above conditions which, of course, necessitate increasing the nutrient intake of the host, helminthiasis may have more serious consequences. The diseased host may suffer from severe inflammation of the intestinal lining resulting in hemorrhaging. Advanced and uncontrolled helminthiasis can lead to prostration and death. It is apparent, therefore, that helminthiasis is a disease of major concern from the standpoint of both public health and economic losses brought about by infestation of domestic animals with parasitic worms and that the provision of methods and compositions effective in preventing and treating helminthiasis are of importance.

Among the anthelmintic compounds commercially available heretofore, phenothiazine is one of the most popular. Phenothiazine and a large number of its derivatives have been studied in detail. Sodium fluoride and some piperazine compounds have also received attention as anthelmintics. While such materials are undoubtedly of value in treating and controlling various species of helminths, research has continued for more potent anthelmintics and for substances having a broader spectrum of activity.

It is an object of the present invention to provide new and novel anthelmintic compositions. It is a further object to provide such compositions wherein the anthelmintic compound has a high degree of activity, and is effective against a broad spectrum of helminths. A further object of the invention is the provision of safe, convenient and effective methods for preventing and treating helminthic infections. Other objects will become apparent from the following description of the invention.

According to this invention, it has now been found that highly effective anthelmintic compositions are produced when the active ingredient of such compositions is a benzoxazole or benzothiazole substituted at the 2-position with a five-membered heterocyclic radical having oxygen, sulfur or nitrogen as the sole hetero atom. More specifically, the anthelmintic compounds of the invention have the structural formula

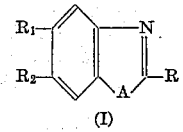

(I)

where A is oxygen or sulfur. R is a five-membered heterocyclic ring having only one hetero atom. Such hetero atom may be oxygen, sulfur or nitrogen. $R_1$ and $R_2$ may be hydrogen or, alternatively, they may be alkyl, alkoxy, alkylthio, aryloxy or arylthio radicals; taken together, $R_1$ and $R_2$ may represent the 1,4-butadienyl radical,

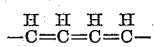

As will be noted from the above formula, the anthelmintics described herein are all substituted benzoxazoles (where A is oxygen) or benzothiazoles (where A is sulfur). At the 2-position, they have a heterocyclic radical containing one hetero atom which may be either oxygen, sulfur or nitrogen. The heterocyclic ring, which is five-membered, will be a thienyl

furyl

or pyrryl ring

$R_1$ and $R_2$ represent substituents at the 5- and 6-positions of the benzoxazole or benzothiazole ring. In the preferred compositions of the invention, $R_1$ and $R_2$ are hydrogen. One or both may, however, be a lower alkyl radical such as a methyl, ethyl, propyl or t-butyl, or they may be lower alkoxy or lower alkylthio substituents of the type exemplified by methoxy, ethoxy, i-propoxy, methylthio, ethylthio and butylthio radicals. $R_1$ and $R_2$ may also be aryloxy or arylthio groups, examples of which are phenoxy, p-methylphenoxy and phenylthio radicals. When $R_1$ and $R_2$ taken together represent the butadienyl radical (—CH=CH—CH=CH—), the compounds will have the formula

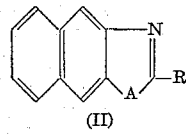

(II)

A and R having the same meanings as described above.

As representative of the compounds which are defined generally by Formula I and which may be formulated into the anthelmintic compositions of this invention, there may be mentioned 2-(2'-furyl)-benzothiazole,
2-(2'-thienyl)-benzothiazole,
2-(3'-thienyl)-benzothiazole,
2-(2'-pyrryl)-benzothiazole, 2-(2'-furyl)-5-methyl-benzothiazole,
2-(2'-furyl)-5,6-benz-benzothiazole,
2-(2'-furyl)-benzoxazole,
2-(2'-thienyl)-benzoxazole,
2-(3'-furyl)-benzoxazole, and
2-(2'-pyrryl)-5-methylthio-benzoxazole.

In accordance with the invention, it has now been found that helminthiasis may be effectively controlled in animals susceptible to the disease by the administration of a small but effective quantity of a benzoxazole or benzothiazole of Formula I. Oral administration is preferred although other routes may be used if desirable for any reason. The anthelmintic substances described herein are primarily effective against the eggs or larvae of the parasites and so are well suited for prophylatic use.

For use in the treatment or prevention of helminthiasis, compositions are employed wherein the benzothiazoles and benzoxazoles are incorporated in or intimately admixed with suitable carriers or diluents. The amount of anthelmintic agent employed will, of course, depend upon the particular 2-substituted benzothiazole or benzoxazole utilized, the species of animal to be treated and the method of treatment to be employed, the severity and type of the infection and whether therapeutic or prophylactic use is intended.

When domesticated animals such as sheep, goats or cattle are to be treated therapeutically for an established anthelmintic infection, it is preferred to administer the compounds orally in boluses or drenches. Such compositions are generally given as a single dose or at frequent intervals over a short period of time. Daily doses of from 20–400 mg. of benzothiazole or benzoxazole per kilogram of animal body weight, and preferably of 40–300 mg./kg. of body weight are normally employed. Either single or divided doses may be used. Administration of the compounds at these levels for just one day is normally an adequate course of therapeutic treatment, although additional treatments may be employed without adverse results. The boluses or drenches used for this type of administration contain the desired concentration of anthelmintic agent intimately dispersed or dissolved in diluents or carriers. The compounds are blended or mixed with innocuous orally ingestible nutrient diluents, fillers, binders, lubricants, suspending agents, wetting agents and like excipients by conventional formulating techniques. In general, boluses, tablets and drenches containng from about 5–70% by weight of active ingredient may be satisfactorily employed to supply the animal with the required dose of benzothiazole or benzoxazole compound. Alternatively, the anthelmintics may be administered parenterally or intramuscularly after dissolving or suspending them in a suitable sterile carrier vehicle such as an isotonic saline vehicle.

When continuous administration of the anthelmintic is intended, as for example in the prophylactic use of the drugs, it is preferred to incorporate the active ingredient in the animal feed or drinking water. This is particularly satisfactory when the compounds are to be fed continuously over a period of days. For such purpose it is convenient to prepare initially feed supplements or premixes wherein the anthelmintic is intimately dispersed in an orally ingestible nutrient, carrier that is inert, i.e. non-reactive, with respect to the anthelmintic. These supplements are then incorporated in or added to the finished animal feed. Examples of diluents suitable for the supplement compositions are solid orally ingestible carriers such as distillers' dried grains, alflafa, corn meal, citrus meal, fermentation residues, ground oyster shells, attapulgus clay, wheat shorts, molasses solubles, corn cob meal, edible vegetable substances, toasted dehulled soya flour, soybean mill feed, antibiotic mycelia, soya grits, crushed limestone and the like. In preparing solid compositions the active ingredient is intimately dispersed or admixed throughout the carrier vehicle by techniques such as grinding, stirring, milling or tumbling. By selecting proper diluents and by altering the ratio of carrier to active ingredient, compositions of any desired concentration may be prepared.

Where the benzoxazoles or benzothiazoles are to be adminstered via the feed, efficacious results are obtained when the feed contains from about 0.02% to about 0.2% by weight of the anthelmintic. Such medicated feed compositions can be prepared either for direct use by mixing the above amount of active ingredient directly with the feed or, preferably, as feed supplements containing higher concentrations of the active ingredient uniformly dispersed in a solid edible carrier. The supplements are then dispersed or mixed into the feed to produce the desired concentration of active ingredient for feeding. Since it is convenient for the feed manufacturer to use about one pound of feed supplement for each ton of finished feed, the desired concentration of active ingredient in the feed supplement is partly a function of the level of anthelmintic desired in the finished feed. In general, feed supplements containing from about 2.5% to about 50% by weight of active ingredient are employed to supply the desired dosage in the finished feed.

Examples of typical feed supplements containing the 2-(heterocyclic) benzoxazoles or benzothiazoles dispersed in a solid inert carrier are:

|  | Lbs. |
|---|---|
| A. 2-(2'-thienyl)-benzoxazole | 10.0 |
| Corn distillers' dried grains | 90.0 |
| B. 2-(3'-thienyl)-benzothiazole | 15.0 |
| Wheat shorts | 85.0 |
| C. 2-(2'-furyl)-benzothiazole | 12.0 |
| Molasses solubles | 88.0 |
| D. 2-(2'-pyrryl)-benzoxazole | 15.0 |
| Soya grits | 40.0 |
| Wheat shorts | 45.0 |
| E. 2-(2'-pyrryl)-benzothiazole | 20.0 |
| Ground oyster shells | 40.0 |
| Citrus meal | 40.0 |
| F. 2-(2'-pyrryl)-5-phenylthio-benzothiazole | 30.0 |
| Corn meal | 70.0 |

In the preparation of these and other similar feed supplements, the active ingredient is added to the carrier and the whole mixed to give substantially uniform dispersion of the anthelmintic agent.

Additional methods of administering these benzoxazoles and benzothiazoles comprise formulating the anthelmintic in the salt blocks that are commonly made accessible to animals such as cattle and sheep, or by suspending or dissolving the active ingredient in the drinking water of the animals.

Alternatively, they may be mixed into the protein and vitamin supplements that are used as top dressings for the feeds of the larger domesticated animals. When this method of administration is used, satisfactory results are achieved with protein supplements containing about 5–15 gm. of anthelmintic per pound when cattle are to be treated, and about 2–10 gm./lb. when smaller ruminants such as sheep and goats are treated.

Most of the benzoxazoles and benzothiazoles intended for use in the compositions of this invention, i.e. the compounds of Formula I, have been previously described in the scientific literature. In general, they may be conveniently prepared by the reaction of an o-aminophenol or o-aminothiophenol with a heterocyclic carboxylic acid.

This synthesis is carried out by intimately contacting equimolar amounts of the two reactants at elevated temperatures of about 80–200° C. The resulting benzoxazole or benzothiazole is recovered by sublimation and/or by solvent extraction of the reaction product. A convenient method of purifying the 2-heterocyclic benzoxazoles or benzothiazoles is via chromatography on an absorbent such as neutral or acid-washed alumina, and recovery of the benzazoles by elution of the column with ethyl acetate or petroleum ether.

When end products having alkyl, alkoxy, aryloxy, alkylthio or arylthio substituents at the 5- and/or 6-substituents are desired, the o-aminophenol or o-aminothiophenol starting material is, of course, substituted with such grouping at the 4- or 5-position of the phenol or thiophenol starting material.

Instead of reacting the phenol or thiophenol with the carboxy heterocyclic compound which is to be attached to the 2-position of the benzoxazole or benzothiazole, the carboxylic acid derivatives of the heterocycle, such as the acid halide, lower alkyl ester, amide or nitrile may be used. Thus, typical heterocyclic starting materials that might be mentioned are 2-thiophene carboxylic acid, 3-thiophene carboxamide, 2-furoic acid, 2-furoic acid chloride, ethyl-2-furyl-carboxylate, and methyl-2-thiophene-carboxylate.

Alternatively, the anthelmintics may be obtained from the reacting together of o-aminophenol or o-aminothiophenol with an aldehyde derivative of the five-membered heterocyclic ring. This process is particularly useful for making 2-substituted benzothiazoles. For example, 2-(2'-pyrryl)-benzothiazole is synthesized by intimately contacting substantially equimolar amounts of o-aminothiophenol and pyrryl-2-aldehyde and heating the two in a hydrocarbon solvent. 2-(2'-pyrryl)-benzothiazoline is the immediate reaction product, and this is oxidized, as with ferric chloride, to form the benzothiazole:

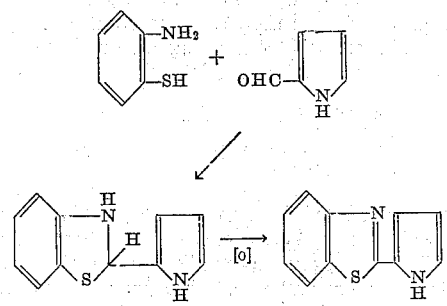

The following examples are given for the purpose of illustration and not by way of limitation:

EXAMPLE 1

Examples of typical boluses containing the anthelmintics described herein are:

|  | Gm. |
|---|---|
| A. 2-(2'-furyl)-benzoxazole | 2.0 |
| Dicalcium phosphate | 3.0 |
| Starch | 0.54 |
| Guar gum | 0.15 |
| Talc | 0.14 |
| Magnesium stearate | 0.05 |
| B. 2-(2'-pyrryl)-benzothiazole | 4.0 |
| Starch | 0.7 |
| Dicalcium phosphate | 1.0 |
| Magnesium stearate | 0.03 |
| Talc | 0.12 |
| Guar gum | 0.2 |
| C. 2-(2'-thienyl)-5-methoxy-benzoxazole | 2.0 |
| Starch | 0.5 |
| Dicalcium phosphate | 3.0 |
| Guar gum | 0.15 |
| Talc | 0.14 |
| Magnesium stearate | 0.05 |

The dicalcium phosphate and the anthelmintic compound are thoroughly mixed and the mixture reduced to a particle size finer than 60 mesh. About one-half of the starch is added, as an aqueous paste, and the resulting mixture granulated. The granules are passed through a #10 mesh screen and dried at 110–130° F. for about 8 hours. The dried material is then passed through a #16 mesh screen. The guar gum and the balance of the starch are added and the mixture thoroughly blended. Finally, the remainder of the ingredients are added and the entire mass thoroughly mixed and compressed into a bolus. (The magnesium stearate, talc and guar gum are of a particle size to pass a #10 mesh screen.)

EXAMPLE 2

Drenches having the following composition are prepared by standard formulating methods:

A. 2-(2'-furyl)-benzothiazole _____gm__ 2.3
   Antifoam AF emulsion _____gm__ 0.06
   Hydroxyethyl cellulose _____gm__ 0.3
   Sodium phosphate monobasic _____gm__ 0.3
   Benzalkonium chloride (12.8% soln.) _____ml__ 0.6
   Water to 30.0 ml.

B. 2-(2'-thienyl)-benzothiazole _____gm__ 4.0
   Antifoam AF emulsion _____gm__ 0.06
   Hydroxyethyl cellulose _____gm__ 0.3
   Sodium phosphate monobasic _____gm__ 0.3
   Benzalkonium chloride (12.8% soln.) _____ml__ 0.6
   Water to 30.0 ml.

C. Drenches may also be prepared in bulk for subdivision prior to use. The following vehicles are suitable:

(1) Benzalkonium chloride (12.8% soln.) __ml__ 40
       Antifoam AF emulsion _____gm__ 4
       Hydroxyethyl cellulose _____gm__ 20
       Distilled water to 2000 ml.

(2) Benzalkonium chloride (12.8% soln.) __ml__ 0.5
       Antifoam AF emulsion _____gm__ 4
       Hydroxyethyl cellulose _____gm__ 20
       Distilled water to 2000 ml.

The compounds of Formula I above are added to the vehicles in concentrations in the range of 6–25 gm./100 ml.

The benzalkonium chloride used in the drench vehicles is a mixture of $C_8$–$C_{18}$ dimethylbenzylammonium chlorides.

EXAMPLE 3

2-(2'-Thienyl)-Benzoxazole 12.8 gm. (0.1 m.) of 2-thiophene carboxylic acid and 10.0 gm. (0.1 m.) of o-aminophenol are heated in a round-bottom flask for 2 hours at a bath temperature of 150–175° C. The temperature is then increased slowly to remove water and ammonium hydroxide by distillation. The temperature is further increased until the 2-(2'-thienyl)-benzoxazole distils, at 235–245° C. (atmospheric pressure). 9.0 gm. of the crude distillate is washed with 10% sodium hydroxide and then with water. It is then recrystallized from aqueous ethanol. 1.0 gm. of the product thus obtained is dissolved in a small volume of benzene and the solution poured onto a column of 30 gm. of acid-washed alumina. The column is eluted with petroleum ether (100 ml. cuts). The fractions containing solid material are combined and concentrated in vacuo to a small volume, whereupon 2-(2'-thienyl)-benzoxazole crystallizes. On recrystallization from ethyl ether, it melts at 104–105° C.

2-(2'-furyl) - benzoxazole is prepared by the above method from o-aminophenol and α-furoic acid. This method may also be employed for preparation of the other 2-substituted benzothiazoles and benzoxazoles described herein, and is particularly suited to synthesis of 2-(furyl)- and 2-(thienyl)-benzoxazoles.

EXAMPLE 4

2-(2'-Pyrryl)-Benzothiazole 12.5 gm. of o-aminobenzenethiol and 11 gm. of pyrrole-2-aldehyde are added to 30 ml. of pyridine and the mixture heated at 90° C. for 30 minutes. The reaction mixture is cooled and poured into 150 ml. of 3 N hydrochloric acid. 2 - (2' - pyrryl) - benzothiazoline crystallizes. It is separated by filtration and purified by recrystallization from anhydrous ethanol.

6 gm. of the 2-(2'-pyrryl)-benzothiazoline are dissolved in about 20 ml. of ethanol. To this solution are added 5 gm. of ferric chloride in 10 ml. of ethanol, and the whole heated on a steam bath for 30 minutes. It is then diluted with about 20 ml. of water and decanted from any oil that separates. On chilling the clear solution 2-(2'-pyrryl)-benzothiazole separates. It is recovered and purified by recrystallization from ethyl acetate.

The above procedure is suitable for making the other benzothiazoles of this invention from the appropriate starting materials. When employed for preparing the benzoxazoles of the invention, the intermediate 2-substituted benzoxazoline is not isolated. If desired, it need not be isolated in syntheses of the benzothiazoles either.

Any departure from the above description which conforms to the present inevntion is intended to be included within the scope of the claims.

What is claimed is:

1. A composition useful in the treatment of helminthiasis that comprises a solid orally ignestible nutrient carrier having uniformly distributed therein as an anthelmintic agent a compound of the formula

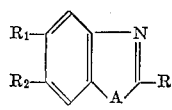

wherein A is selected from the class consisting of oxygen and sulfur, $R_1$ and $R_2$ are each selected from the class consisting of hydrogen, lower alkyl, lower alkoxy, lower alkylthio, phenoxy and phenylthio groups, and wherein $R_1$ and $R_2$ taken together represent the 1,4-butadienyl radical, and R is selected from the class consisting of thienyl, pyrryl and furyl radicals.

2. The composition of claim 1 wherein the carrier is an animal feed supplement.

3. The composition of claim 1 wherein the carrier is a solid in unit dosage form.

4. A composition for the control of helminthiasis that comprises a liquid drench vehicle containing as an effective anthelmintic agent 2-(2'-furyl)-benzothiazole, and a suspending agent.

5. A composition useful in the control of helminthiasis that comprises a protein supplement having dispersed therein as an anthelmintic agent 2-(2'-pyrryl)-benzothiazole.

6. A composition for the control of helminthiasis that comprises a bolus having dispersed therein as an effective anthelminitic agent 2-(thienyl)-benzoxazole.

7. An anthelmintic composition that comprises a solid orally administrable nutrient carrier having dispersed therein as an active anthelmintic agent from about 5–70% by weight of a compound of the formula

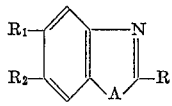

wherein A is selected from the class consisting of oxygen and sulfur, $R_1$ and $R_2$ are each selected from the class consisting of hydrogen, lower alkyl, lower alkoxy, lower alkylthio, phenoxy and phenylthio groups, and wherein $R_1$ and $R_2$ taken together represent the 1,4-butadienyl radical, and R is selected from the class consisting of thienyl, pyrryl and furyl radicals.

8. An animal feed having dispersed therein as an effective anthelmintic agent from about 0.02% to 0.2% by weight of a compound of the formula

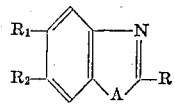

wherein A is selected from the class consisting of oxygen and sulfur, $R_1$ and $R_2$ are each selected from the class consisting of hydrogen, lower alkyl, lower alkoxy, lower alkylthio, phenoxy and phenylthio groups, and wherein $R_1$ and $R_2$ taken together represent the 1,4-butadienyl radical, and R is selected from the class consisting of thienyl, pyrryl and furyl radicals.

9. An animal feed supplement having dispersed therein from about 2.5% to 50% by weight of a compound of the formula

wherein A is selected from the class consisting of oxygen and sulfur, $R_1$ and $R_2$ are each selected from the class consisting of hydrogen, lower alkyl, lower alkoxy, lower alkylthio, phenoxy and phenylthio groups, and wherein $R_1$ and $R_2$ taken together represent the 1,4-butadienyl radical, and R is selected from the class consisting of thienyl, pyrryl and furyl radicals.

10. A liquid drench useful for the control and prevention of helminthiasis comprising water, a suspending agent and a compound of the formula

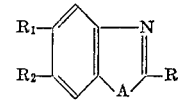

wherein A is selected from the class consisting of oxygen and sulfur, $R_1$ and $R_2$ are each selected from the class consisting of hydrogen, lower alkyl, lower alkoxy, lower alkylthio, phenoxy and phenylthio groups, and wherein $R_1$ and $R_2$ taken together represent the 1,4-butadienyl radical, and R is selected from the class consisting of thienyl, pyrryl and furyl radicals.

11. The method of combatting helminthiasis that comprises administering to a host animal susceptible to helminthiasis an effective, non-toxic amount of a compound having the formula

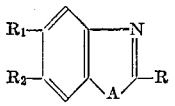

wherein A is selected from the class consisting of oxygen and sulfur, $R_1$ and $R_2$ are each selected from the class consisting of hydrogen, lower alkyl, lower alkoxy, lower alkylthio, phenoxy and phenylthio groups, and wherein $R_1$ and $R_2$ taken together represent the 1,4-butadienyl radical, and R is selected from the class consisting of thienyl, pyrryl and furyl radicals.

References Cited in the file of this patent

UNITED STATES PATENTS 2,581,009    Emerson  ---------------- Jan. 1, 1952

OTHER REFERENCES

Naiman: Chem. Abst., vol. 29, 1935, page 7328[5].

Chem. Abst. Fifth Decennial Index, Subject B–Bz, 1947–1956, page 1633c.

Parrini: Chem Abst., vol 52, 1958, page 9121e,